(12) United States Patent
Lin et al.

(10) Patent No.: US 9,251,729 B2
(45) Date of Patent: Feb. 2, 2016

(54) DISPLAY SYSTEM AND METHOD THEREOF

(75) Inventors: Yung-Sen Lin, New Taipei (TW);
Neng-Wen Yeh, New Taipei (TW);
Chien-Po Hsu, New Taipei (TW)

(73) Assignee: ACER INCORPORATED, Xizhi Dist., New Taipei (TW)

( * ) Notice: Subject to any disclaimer, the term of this patent is extended or adjusted under 35 U.S.C. 154(b) by 831 days.

(21) Appl. No.: 13/424,388

(22) Filed: Mar. 20, 2012

(65) Prior Publication Data

US 2012/0242658 A1 Sep. 27, 2012

(30) Foreign Application Priority Data

Mar. 22, 2011 (TW) .............................. 100109684 A

(51) Int. Cl.
*H04N 13/04* (2006.01)
*H04N 9/47* (2006.01)
*G09G 3/00* (2006.01)

(52) U.S. Cl.
CPC ........... *G09G 3/003* (2013.01); *H04N 13/0438* (2013.01); *H04N 13/0452* (2013.01); *H04N 13/0497* (2013.01)

(58) Field of Classification Search
CPC ........... G02B 27/2264; H04N 13/0438; G09G 2360/144
USPC ...................................... 348/51, 56; 345/419
See application file for complete search history.

(56) References Cited

U.S. PATENT DOCUMENTS

| 5,325,192 | A | 6/1994 | Allen | |
|---|---|---|---|---|
| 6,791,599 | B1 | 9/2004 | Okada et al. | |
| 8,451,279 | B2 | 5/2013 | Gorla | |
| 2009/0085485 | A1* | 4/2009 | Young | 315/155 |
| 2010/0060723 | A1* | 3/2010 | Kimura et al. | 348/56 |
| 2010/0123839 | A1* | 5/2010 | Lu | 349/15 |
| 2010/0207954 | A1 | 8/2010 | Kim | |
| 2011/0221871 | A1* | 9/2011 | Sakaniwa et al. | 348/51 |
| 2012/0019493 | A1* | 1/2012 | Barnhoefer et al. | 345/207 |

FOREIGN PATENT DOCUMENTS

| CN | 1987566 A | | 6/2007 | |
|---|---|---|---|---|
| CN | 101202033 A | | 6/2008 | |
| JP | 63228120 | * | 9/1988 | |
| JP | 63228120 A | * | 9/1988 | ............. G02B 27/26 |
| TW | 200513117 | | 4/2005 | |

* cited by examiner

*Primary Examiner* — Hung Dang
*Assistant Examiner* — Girumsew Wendmagegn
(74) *Attorney, Agent, or Firm* — Winston Hsu; Scott Margo

(57) ABSTRACT

A method of displaying images includes detecting frequency of ambient light, updating frequency of a display device according to the frequency of the ambient light, and adjusting shutter frequencies of a pair of shutter glasses according to the frequency of the ambient light when the display device is in a 3D display mode. In this way, flickers caused by inconsistency between the frequency of the ambient light and the frequencies of the display device and the shutters of the shutter glasses can be avoided.

6 Claims, 4 Drawing Sheets

DISPLAY SYSTEM AND METHOD THEREOF

BACKGROUND OF THE INVENTION

1. Field of the Invention

The present invention is related to a method for displaying images, and more particularly, to a method for preventing flickering caused by frequency of ambient light when a display system displays 3D (three-dimensional) images.

2. Description of the Prior Art

In prior art, 3D images can be generated by utilizing a display device and a pair of shutter glasses. For instance, the display device alternately displays a left image and a right image. When the display device displays the left image, a left shutter of the shutter glasses is turned on and a right shutter of the shutter glasses is turned off for a left eye of a user to receive the left image. When the display device displays the right image, the right shutter of the shutter glasses is turned on and the left shutter of the shutter glasses is turned off, for a right eye of the user to receive the right image. This way, both eyes of the user can receive corresponding images respectively, and a 3D image can be perceived.

However, when the left or right shutter of the shutter glasses is turned on, the user also receives ambient light (e.g. light emitted by an indoor fluorescent tube) in addition to images displayed by the display device. Assuming frequency of the display device is 60 Hertz (Hz), shutter frequency of the shutter glasses is 120 Hz, and frequency of the ambient light is 50 Hz (due to frequency of commercial power), the user will perceive flickering, which is caused by inconsistency between the frequency of the ambient light and the frequencies of the display device and the shutters of the shutter glasses.

SUMMARY OF THE INVENTION

The present invention discloses a method for display images. The method comprises detecting frequency of ambient light; updating frequency of a display device according to the frequency of the ambient light; and when the display device is in a 3D (three-dimensional) display mode, adjusting shutter frequency of a pair of shutter glasses according to the frequency of the ambient light.

The present invention further discloses a display system. The display system comprises a light sensor, a display device, a pair of shutter glasses and a controller. The light sensor is for detecting frequency of ambient light. The display device comprises a 3D display mode and a 2D display mode. When the display device is in the 3D display mode, the display device alternately displays a left image and a right image, and when the display device is in the 2D display mode, the display device displays a 2D image. When the display device displays the left image, a left shutter of the pair of shutter glasses is turned on. When the display device displays the right image, a right shutter of the pair of shutter glasses is turned on. When the display device displays the 2D image, the left and right shutters are both turned on. When the display device is in the 2D display mode, the controller updates frequency of the display device according to the frequency of the ambient light. When the display device is in the 3D display mode, the controller updates the frequency of the display device and adjusts a shutter frequency of the pair of shutter glasses according to the frequency of the ambient light.

The present invention further discloses a display system. The display system comprises a light sensor, a display device, a pair of shutter glasses and a controller. The light sensor is for detecting frequency of ambient light and generating a frequency signal indicating the frequency of the ambient light. The display device comprises a 3D display mode and a 2D display mode. The display device comprises a display card and a display monitor. When the display device is in the 2D display mode, the display card generates a 2D display signal, and when the display device is in the 3D display mode, the display card generates a 3D display signal. When the display card generates the 2D display signal, the display monitor displays a 2D image according to the 2D display signal, and when the display card generates the 3D display signal, the display monitor alternately displays a left image and a right image according to the 3D display signal. When the display monitor displays the left image, a left shutter of the pair of shutter glasses is turned on. When the display monitor displays the right image, a right shutter of the pair of shutter glasses is turned on. When the display monitor displays the 2D image, the left and right shutters of the pair of shutter glasses are both turned on. The controller comprises an input/output unit and a central processing unit. The input/output unit is for receiving the frequency signal and transmitting an adjusting signal. When the display device is in the 2D display mode, the central processing unit updates frequency of the display monitor via the display card according to the frequency of the ambient light indicated by the frequency signal, and when the display device is in the 3D display mode, the central processing unit updates the frequency of the display monitor via the display card, and controls the input/output unit to transmit the adjusting signal for adjusting a shutter frequency of the pair of shutter glasses according to the frequency of the ambient light indicated by the frequency signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
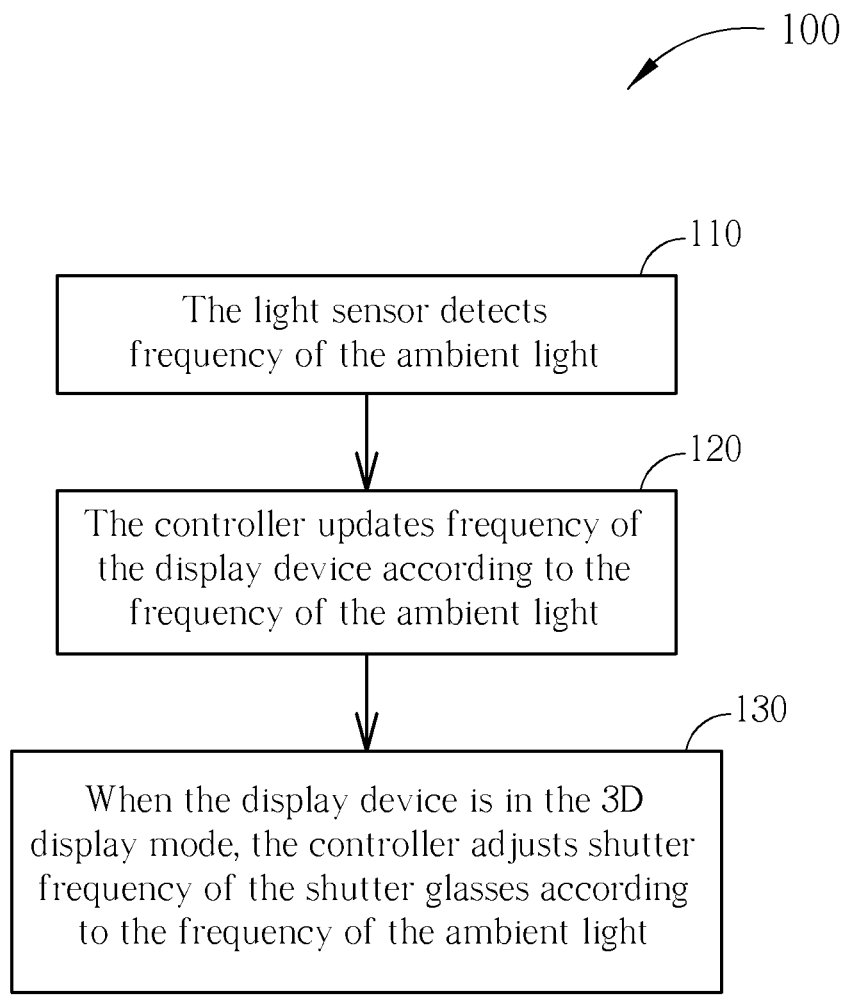
FIG. 1 is a diagram illustrating a method for displaying images according to an embodiment of the present invention.
Figure 2:
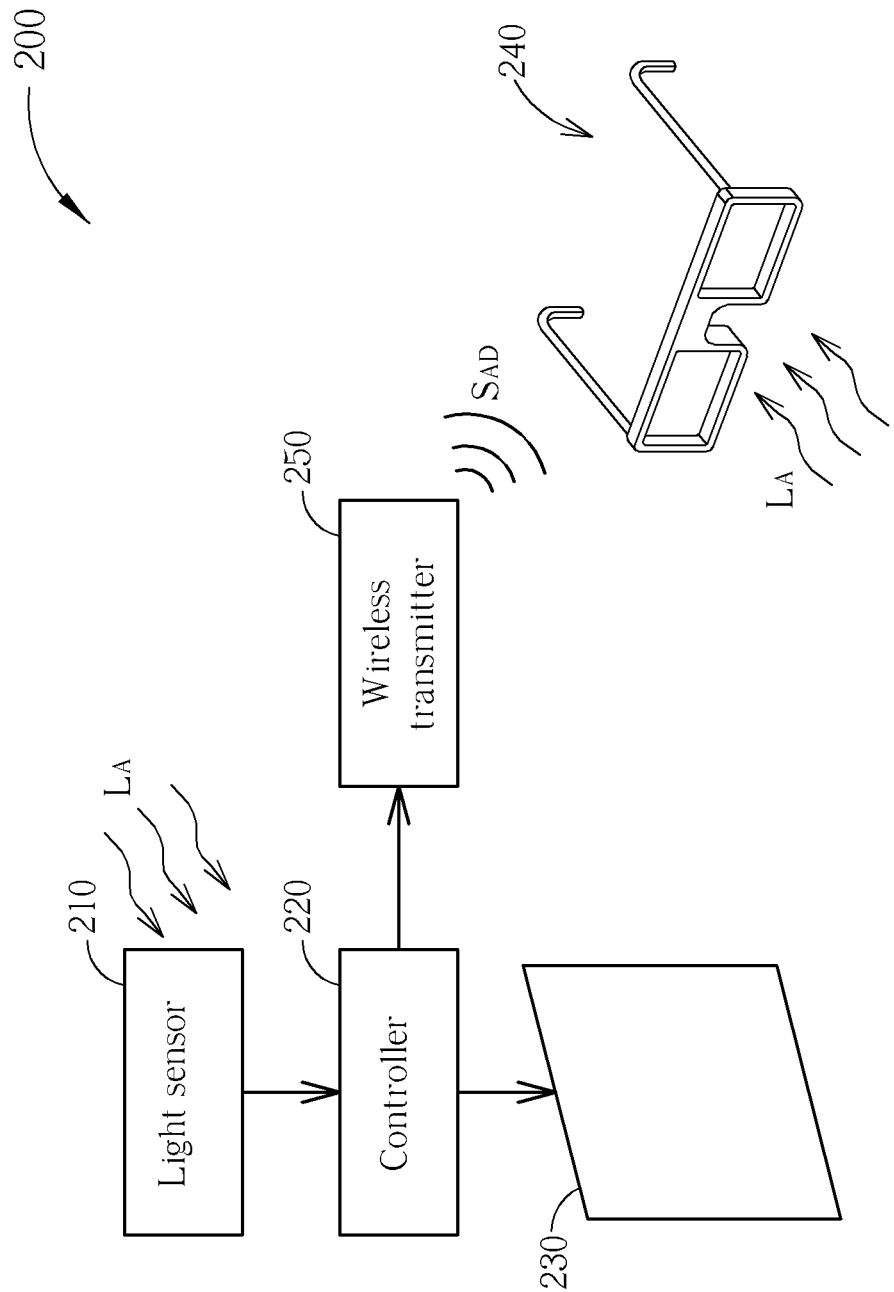
FIG. 2 is a diagram illustrating the display system.

Please refer to FIG. 1 and FIG. 2. FIG. 1 is a diagram illustrating a method 100 for displaying images according to an embodiment of the present invention. The method 100 for displaying images is applied to a display system 200. FIG. 2 is a diagram illustrating the display system 200. The display system 200 comprises a light sensor 210, a controller 220, a display device 230, a pair of shutter glasses 240 and a wireless transmitter 250. The display device 230 is capable of operating in a 3D display mode and a 2D display mode.

When the display device 230 is in the 3D display mode, the display device 230 alternately displays a left image and a right image. More specifically, when the display device 230 displays the left image, a left shutter of the shutter glasses 240 is turned on and a right shutter of the shutter glasses 240 is turned off for a left eye of a user to receive the left image. When the display device 230 displays the right image, the right shutter of the shutter glasses 240 is turned on and the left shutter of the shutter glasses 240 is turned off, for a right eye of the user to receive the right image. This way, both eyes of the user can receive corresponding images respectively to perceive a 3D image.

When the display device 230 is in the 2D display mode, the display device 230 displays a 2D image, and both the left and right shutters of the shutter glasses 240 are turned on for the user to receive the 2D image. However, when the left or right shutter of the shutter glasses 240 is turned on, the user further receives ambient light $L_A$ in addition to the images provided by the display device 230. Steps of the method 100 of the present invention for displaying images are further detailed below:

Step 110: the light sensor 210 detects frequency of the ambient light $L_A$;

Step 120: the controller 220 updates frequency of the display device 230 according to the frequency of the ambient light $L_A$; and Step 130: when the display device 230 is in the 3D display mode, the controller 220 adjusts shutter frequency of the shutter glasses 240 according to the frequency of the ambient light $L_A$.

Figure 3:
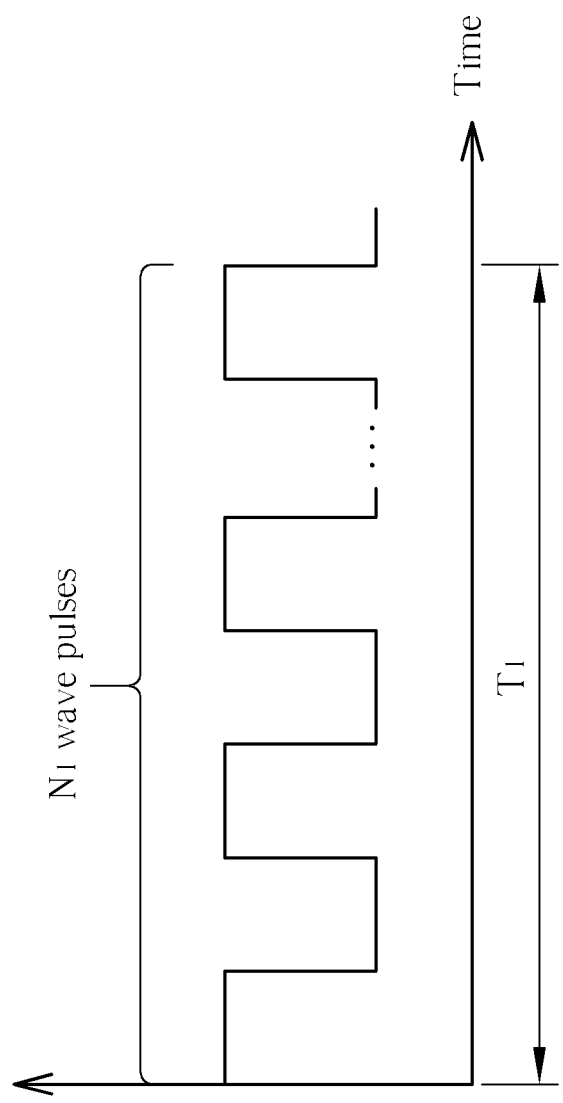
FIG. 3 is a waveform diagram illustrating a waveform of the ambient light.

In step 110, the light sensor 210 detects the ambient light $L_A$ to obtain a waveform of the ambient light $L_A$, as shown in FIG. 3. This way, the light sensor 210 can detect a number $N_1$ of wave pulses of the ambient light $L_A$. The light sensor 210 can calculate the frequency of the ambient light $L_A$ to be $(N_1/T_1)$ according to the number $N_1$ of wave pulses of the ambient light $L_A$ over a duration of a detecting period $T_1$.

In step 120, the controller 220 updates the frequency (e.g. refresh frequency) of the display 230 according to the frequency of the ambient light $L_A$. Furthermore, when the display device 230 is in the 2D display mode, the controller 220 updates the frequency of the display device 230 to substantially equal the frequency of the ambient light $L_A$. For instance, when the frequency of the ambient light $L_A$ detected by the light sensor 210 in step 110 is 50 Hz, the controller 220 updates the frequency of the display device 230 to be 50 Hz, and the display device 230 displays 2D images with the frequency of 50 Hz. When the frequency of the ambient light $L_A$ is 56 Hz, the controller 220 updates the frequency of the display device 230 to be 56 Hz, and the display device 230 displays 2D images with the frequency of 56 Hz. When the frequency of the ambient light $L_A$ is 60 Hz, the controller 220 updates the frequency of the display device 230 to be 60 Hz, and the display device 230 displays 2D images with the frequency of 60 Hz.

When the display device is in the 3D display mode, the controller 220 updates the frequency of the display device 230 to substantially equal twice the frequency of the ambient light $L_A$. For instance, when the frequency of the ambient light $L_A$ is 50 Hz, the controller 220 updates the frequency of the display device 230 to be 100 Hz, so the display device 230 alternately displays the left and right images, and the display device 230 displays approximately a total of 50 left images and 50 right images in one second. When the frequency of the ambient light $L_A$ is 56 Hz, the controller 220 updates the frequency of the display device 230 to be 112 Hz, so the display device 230 alternately displays the left and right images, and the display device 230 displays approximately a total of 56 left images and 56 right images in one second. When the frequency of the ambient light $L_A$ is 60 Hz, the controller 220 updates the frequency of the display device 230 to be 120 Hz, so the display device 230 alternately displays the left and right images, and the display device 230 displays approximately a total of 60 left images and 60 right images in one second.

Generally, the frequency of commercial power equals a first frequency of 60 Hz or a second frequency of 50 Hz. Therefore, in step 120, the controller 220 can also compare the frequency of the ambient light $L_A$ with a threshold value, for determining whether the ambient light $L_A$ is closer to the first frequency of 60 Hz or the second frequency of 50 Hz, and update the frequency of the display device 230 accordingly. Further, when the display device 230 is in the 2D display mode and the frequency of the ambient light $L_A$ is higher than the threshold value, the controller 220 updates the frequency of the display device 230 to substantially equal the first frequency of 60 Hz. When the display device 230 is in the 2D display mode and the frequency of the ambient light $L_A$ is lower than the threshold value, the controller 220 updates the frequency of the display device 230 to substantially equal the second frequency of 50 Hz. For instance, assume the threshold value is 55. When the frequency of the ambient light $L_A$ is 52 Hz, since the frequency of 52 HZ of the ambient light $L_A$ is lower than the threshold value of 55, the controller 220 updates the frequency of the display device 230 to equal the second frequency of 50 Hz, and the display device 230 displays 2D images with a frequency of 50 Hz. When the frequency of the ambient light $L_A$ is 57 Hz, since the frequency of 57 Hz of the ambient light $L_A$ is higher than the threshold value of 55, the controller 220 updates the frequency of the display device 230 to equal the first frequency of 60 Hz, and the display device 230 displays 2D images with a frequency of 60 Hz.

Similarly, when the display device 230 is in the 3D display mode and the frequency of the ambient light $L_A$ is higher than the threshold value, the controller 220 updates the frequency of the display device 230 to substantially equal twice the first frequency of 60 Hz. When the display device 230 is in the 3D display mode and the frequency of the ambient light $L_A$ is lower than the threshold value, the controller 220 updates the frequency of the display device 230 to substantially equal twice the second frequency of 50 Hz. For instance, when the frequency of the ambient light $L_A$ is 52 Hz, since the frequency of 52 Hz of the ambient light $L_A$ is lower than the threshold value of 55, the controller 220 updates the frequency of the display device 230 to substantially equal twice the second frequency of 50 Hz. In other words, the controller 220 updates the frequency of the display device 230 to be 100 Hz, so the display device 230 alternately displays the left and right images, and the display device 230 displays a total of 50 left images and 50 right images in one second. When the frequency of the ambient light $L_A$ is 57 Hz, since the frequency of 57 Hz of the ambient light $L_A$ is higher than the threshold value of 55, the controller 220 updates the frequency of the display device 230 to substantially equal twice the first frequency of 60 Hz. In other words, the controller 220 updates the frequency of the display device 230 to be 120 Hz, so the display device 230 alternately displays the left and right images, and the display device 230 displays a total of 60 left images and 60 right images in one second.

In step 130, when the display device 230 is in the 3D display mode, the controller 220 adjusts the shutter frequency of the shutter glasses 240 according to the frequency of the ambient light $L_A$. More specifically, the controller 220 controls the wireless transmitter 250 to transmit an adjusting signal $S_{AD}$ to the shutter glasses 240 according to the frequency of the ambient light $L_A$. The controller 220 can adjust the shutter frequency of the shutter glasses 240 to substantially equal twice the frequency of the ambient light $L_A$. For instance, when the frequency of the ambient light $L_A$ is 50 Hz, the controller 220 updates the frequency of the display device 230 to be 100 Hz in step 120. The controller 220 also adjusts the shutter frequency of the shutter glasses 240 to be 100 Hz, for matching the shutter frequency of the shutter glasses to the frequency of the display device 230. In other words, the left shutter and the right shutter of the shutter glasses 240 are turned on alternately, where each of the left and right shutters is turned on 50 times in one second. This way, when the display device 230 displays the left image, the left shutter of the shutter glasses 240 is turned on and the right shutter of the shutter glasses 240 is turned off, so the left eye of the user receives 50 left images in one second. When the display device 230 displays the right image, the right shutter of the shutter glasses 240 is turned on and the left shutter of the shutter glasses 240 is turned off, so the right eye of the user receives 50 right images in one second. Therefore, both eyes of the user can receive corresponding images to perceive the 3D image, and since the frequency of the ambient light $L_A$ is in sync with the frequency of the display device 230 and the shutter frequency of the shutter glasses 240, the user does not perceive flickering caused by the ambient light $L_A$ when receiving images provided by the display device 230 via the shutter glasses 240.

Similarly, when the frequency of the ambient light $L_A$ is 56 Hz, the controller 220 adjusts a refresh frequency of the display device 230 to be 112 Hz in step 120, as well as adjusting the shutter frequency of the shutter glasses 240 to 112 Hz, for matching the shutter frequency of the shutter glasses 240 to the refresh frequency of the display device 230. In other words, the left and right shutters of the shutter glasses 240 are turned on alternately, where each of the left and right shutters is turned on 56 times in one second. This way, by matching the shutter frequency of the shutter glasses 240 to the refresh frequency of the display device 230, the user can perceive 3D images. Further, since the frequency of the ambient light $L_A$ is in sync with the refresh frequency of the display device 230 and the shutter frequency of the shutter glasses 240, the user does not perceive flickers caused by the ambient light $L_A$ when receiving images provided by the display device 230 via the shutter glasses 240.

When the frequency of the ambient light $L_A$ is 60 Hz, the controller 220 updates the frequency of the display device 230 to be 120 Hz in step 120. The controller 220 also adjusts the shutter frequency of the shutter glasses 240 to 120 Hz, for matching the shutter frequency of the shutter glasses 240 to the frequency of the display device 230. In other words, the left and right shutters of the shutter glasses 240 are turned on alternatively, where each of the left and right shutters is turned on 60 times in one second. This way, by matching the shutter frequency of the shutter glasses 240 to the frequency of the display device 230, the user can perceive 3D images. Also, since the frequency of the ambient light $L_A$ is in sync with the frequency of the display device 230 and the shutter frequency of the shutter glasses 240, the user does not perceive flickering caused by the ambient light $L_A$ when receiving images provided by the display device 230 via the shutter glasses 240.

On the other hand, the controller 220 can also compare the frequency of the ambient light $L_A$ with a threshold value, and adjust the shutter frequency of the shutter glasses 240 accordingly. When the display device 230 is in the 3D display mode and the frequency of the ambient light $L_A$ is higher than the threshold value, the controller 220 adjusts the shutter frequency of the shutter glasses 240 to substantially equal twice the first frequency of 60 Hz. When the display device 230 is in the 3D display mode and the frequency of the ambient light $L_A$ is lower than the threshold value, the controller 220 adjusts the shutter frequency of the shutter glasses 240 to substantially equal twice the second frequency of 50 Hz. For instance, assume the threshold value is 55. When the frequency of the ambient light $L_A$ is 52 Hz, since the frequency of 52 Hz of the ambient light $L_A$ is lower than the threshold value of 55, the controller 220 updates the frequency of the display device 230 to be 100 Hz, and the controller 220 also adjusts the shutter frequency of the shutter glasses 240 to be 100 Hz. This way, by matching the shutter frequency of the shutter glasses 240 to the frequency of the display device 230, the user can perceive 3D images. Also, since the frequency of the ambient light $L_A$ is approximately in sync with the frequency of the display device 230 and the shutter frequency of the shutter glasses 240, the user almost does not perceive flickers caused by the ambient light $L_A$ when receiving images provided by the display device 230 via the shutter glasses 240.

When the frequency of the ambient light $L_A$ is 57 Hz, since the frequency of 57 Hz of the ambient light $L_A$ is higher than the threshold value of 55, the controller 220 updates the frequency of the display device 230 to be 120 Hz, and the controller 220 also adjusts the shutter frequency of the shutter glasses 240 to be 120 Hz. This way, by matching the shutter frequency of the shutter glasses 240 to the frequency of the display device 230, the user can perceive 3D images. Also, since the frequency of the ambient light $L_A$ is approximately in sync with the frequency of the display device 230 and the shutter frequency of the shutter glasses 240, the user perceives next to no flickering caused by the ambient light $L_A$ when receiving images provided by the display device 230 via the shutter glasses 240.

Figure 4:
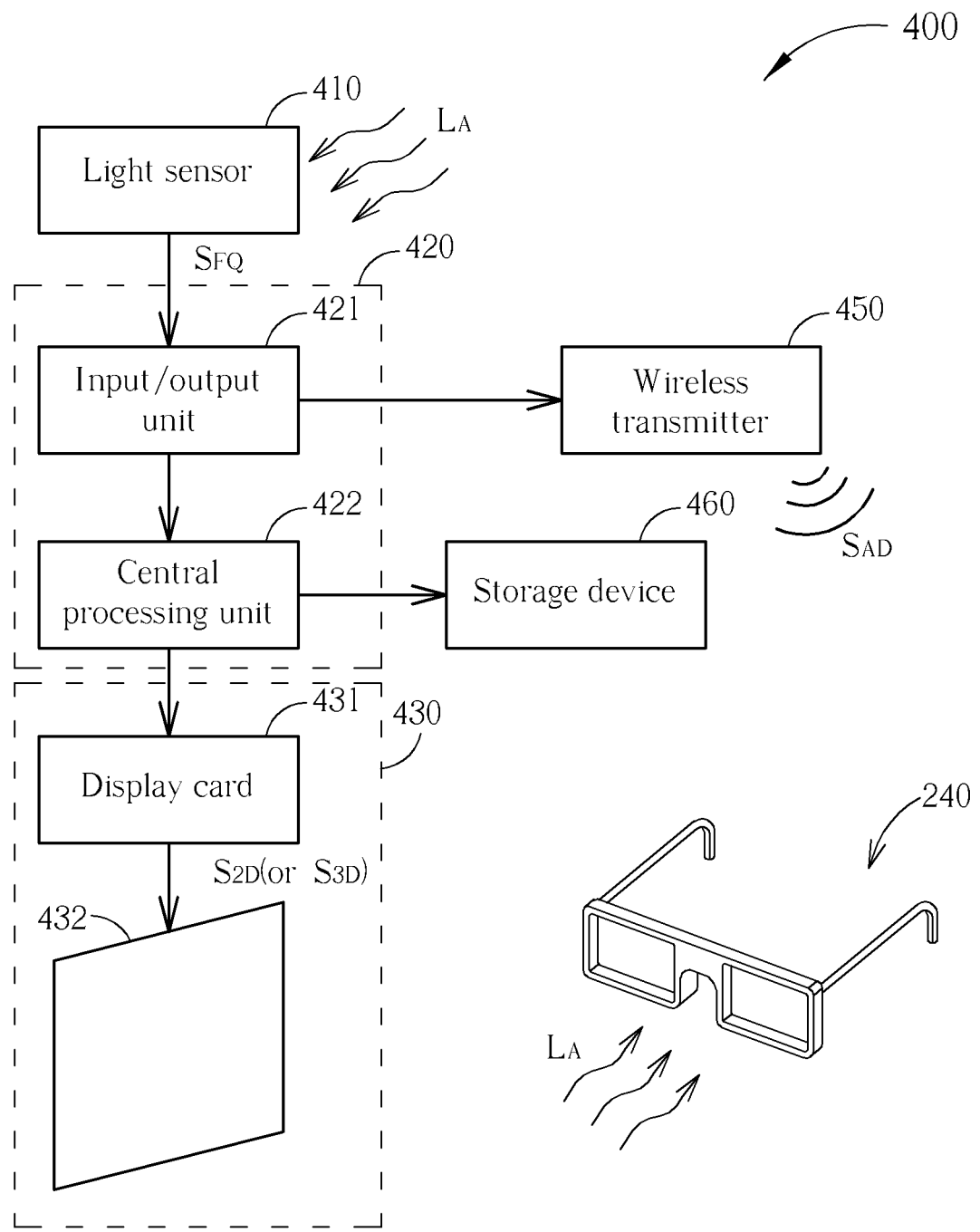
FIG. 4 is a diagram illustrating a display system according to another embodiment of the present invention.

Another embodiment of the present invention is provided according to the principle of method 100. FIG. 4 is a diagram illustrating a display system 400 according to another embodiment of the present invention. The display system 400 comprises a light sensor 410, a controller 420, a display device 430, a pair of shutter glasses 440, a wireless transmitter 450 and a storage device 460. The light sensor 410 detects frequency of ambient light $L_A$, for generating a frequency signal $S_{FQ}$ which indicates the frequency of the ambient light $L_A$. The controller 420 comprises an input/output unit 421 and a central processing unit 422. The input/output unit 421 is for receiving the frequency signal $S_{FQ}$ and transmitting an adjusting signal $S_{AD}$. The display device 430 comprises a 3D display mode and a 2D display mode. The display device 430 comprises a display card 431 and a display monitor 432. When the display device 430 is in the 2D display mode, the display card 431 generates a 2D display signal $S_{2D}$ and the display monitor 432 displays a 2D image according to the 2D display signal $S_{2D}$. At this moment, left and right shutters of the shutter glasses are both turned on for the user to receive the 2D image. When the display device 430 is in the 3D display mode, the display card 431 generates a 3D display signal $S_{3D}$, and the display monitor 432 alternately displays a left image and a right image according to the 3D display signal $S_{3D}$. When the display monitor 432 displays the left image, the left shutter of the shutter glasses 440 is turned on and the right shutter of the shutter glasses 440 is turned off, for the left eye of the user to receive the left image. When the display monitor 432 displays the right image, the right shutter of the shutter glasses 440 is turned on and the left shutter of the shutter glasses 440 is turned off, for the right eye of the user to receive the right image. This way, both eyes of the user can receive corresponding images for perceiving a 3D image.

On the other hand, when the display device 430 is in the 2D display mode, the central processing unit 422 updates frequency of the display monitor 432 via the display card 431 according to the frequency of the ambient light $L_A$ indicated by the frequency signal $S_{FQ}$ which is received by the input/output unit 421. When the display device 430 is in the 3D display mode, the central processing unit 422 updates the frequency of the display monitor 432 via the display card 431 according to the frequency of the ambient light $L_A$ indicated by the frequency signal $S_{FQ}$. The central processing unit 422 controls the wireless transmitter 450 via the input/output unit 421 to transmit the adjusting signal $S_{AD}$ to the shutter glasses 440 for adjusting a shutter frequency of the shutter glasses 440. The central processing unit 422 updates the frequency of the display monitor 432 and adjusts the shutter frequency of the shutter glasses 440 similarly to steps 120 and 130 of the method 100. For instance, when the display device 430 is in the 2D display mode, the controller 420 updates the frequency of the display device 430 to substantially equal the frequency of the ambient light $L_A$. When the display device 430 is in the 3D display mode, the controller 420 updates the frequency of the display device 430 to substantially equal twice the frequency of the ambient light $L_A$, as well as adjusting the shutter frequency of the shutter glasses 440 to substantially equal twice the frequency of the ambient light $L_A$.

In addition to the methods above, the central processing unit 422 can also compare the frequency of the ambient light $L_A$ with a threshold value, and update the frequency of the display device 430 and the shutter frequency of the shutter glasses 440 accordingly. More specifically, when the display device 430 is in the 2D display mode and the frequency of the ambient light $L_A$ is higher than the threshold value, the central processing unit 422 updates the frequency of the display monitor 432 to substantially equal a first frequency (e.g. 60 Hz). When the display device 430 is in the 2D display mode and the frequency of the ambient light $L_A$ is lower than the threshold value, the central processing unit 422 updates the frequency of the display monitor 432 to substantially equal a second frequency (e.g. 50 Hz).

When the display device 430 is in the 3D display mode and the frequency of the ambient light $L_A$ is higher than the threshold value, the central processing unit 422 updates the frequency of the display device 430 to substantially equal twice the first frequency of 60 Hz, and adjusts the shutter frequency of the shutter glasses 440 to substantially equal twice the first frequency of 60 Hz. When the display device 430 is in the 3D display mode and the frequency of the ambient light $L_A$ is lower than the threshold value, the central processing unit 422 updates the frequency of the display device 430 to substantially equal twice the second frequency of 50 Hz, and adjusts the shutter frequency of the shutter glasses 440 to substantially equal twice the second frequency of 50 Hz.

In FIG. 4, the storage device 460 is for storing a digital content. When the user is to view the digital content stored in the storage device 460, the central processing unit 422 transmits the digital content to the display card 231. When the digital content stored in the storage device 460 corresponds to a 2D image, the display device 430 is in the 2D display mode, and the display card 431 generates a 2D display signal $S_{2D}$. When the digital content stored in the storage device 460 corresponds to a 3D image, the display device 430 is in the 3D display mode, and the display card 431 generates a 3D display signal $S_{3D}$.

In summary, the present invention provides a method for displaying images. The method comprises detecting frequency of ambient light, updating frequency of a display device according to the frequency of the ambient light, and when the display device is in a 3D display mode, adjusting shutter frequency of a pair of shutter glasses according to the frequency of the ambient light. This way, even if the frequency of the ambient light changes with the frequency of commercial power, the method of the present invention can still set the shutter frequencies of the shutter glasses and the display device to be consistent with the frequency of the ambient light, for preventing flickering generated due to the ambient light. The present invention further discloses a display system according to an embodiment of the present invention. A controller of the display system of the present invention updates the frequency of the display device according to the frequency of the ambient light, and adjusts the shutter frequency of the shutter glasses. Therefore, the display system of the present invention can prevent flickering generated due to the ambient light.

Those skilled in the art will readily observe that numerous modifications and alterations of the device and method may be made while retaining the teachings of the invention.

What is claimed is:

1. A display system, comprising:
   a light sensor, for detecting frequency of ambient light;
   a display device, comprising a 3D display mode and a 2D display mode, wherein when the display device is in the 3D display mode, the display device alternately displays a left image and a right image, and when the display device is in the 2D display mode, the display device displays a 2D image;
   a pair of shutter glasses, wherein when the display device displays the left image, a left shutter of the pair of shutter glasses is turned on, when the display device displays the right image, a right shutter of the pair of shutter glasses is turned on, and when the display device displays the 2D image, the left and right shutters are both turned on; and
   a controller, wherein when the display device is in the 2D display mode, the controller updates frequency of the display device according to the frequency of the ambient light, and when the display device is in the 3D display mode, the controller updates the frequency of the display device and adjusts a shutter frequency of the pair of shutter glasses according to the frequency of the ambient light;
   wherein when the display device is in the 2D display mode and the frequency of the ambient light is higher than a threshold value, the controller updates the frequency of the display device to substantially equal a first frequency, when the display device is in the 2D display mode and the frequency of the ambient light is lower than the threshold value, the controller updates the frequency of the display device to substantially equal a second frequency, when the display device is in the 3D display mode and the frequency of the ambient light is higher than the threshold value, the controller updates the frequency of the display device to substantially equal twice the first frequency, and adjusts the shutter frequency of the pair of shutter glasses to substantially equal twice the first frequency, and when the display device is in the 3D display mode and the frequency of the ambient light is lower than the threshold value, the controller updates the frequency of the display device to substantially equal twice the second frequency, and adjusts the shutter frequency of the pair of shutter glasses to substantially equal twice the second frequency.

2. The display system of claim 1, further comprising:
   a wireless transmitter, wherein the controller controls the wireless transmitter to transmit an adjusting signal to the pair of shutter glasses for adjusting the shutter frequency of the pair of shutter glasses.

3. A display system, comprising:

a light sensor for detecting frequency of ambient light and generating a frequency signal indicating the frequency of the ambient light;

a display device, comprising a 3D display mode and a 2D display mode, the display device comprising:

- a display card, wherein when the display device is in the 2D display mode, the display card generates a 2D display signal, and when the display device is in the 3D display mode, the display card generates a 3D display signal; and
- a display monitor, wherein when the display card generates the 2D display signal, the display monitor displays a 2D image according to the 2D display signal, and when the display card generates the 3D display signal, the display monitor alternately displays a left image and a right image according to the 3D display signal;

a pair of shutter glasses, wherein when the display monitor displays the left image, a left shutter of the pair of shutter glasses is turned on, when the display monitor displays the right image, a right shutter of the pair of shutter glasses is turned on, and when the display monitor displays the 2D image, the left and right shutters of the pair of shutter glasses are both turned on; and a controller, comprising:

- an input/output unit, for receiving the frequency signal and transmitting an adjusting signal; and
- a central processing unit, wherein when the display device is in the 2D display mode, the central processing unit updates frequency of the display monitor via the display card according to the frequency of the ambient light indicated by the frequency signal, and when the display device is in the 3D display mode, the central processing unit updates the frequency of the display monitor via the display card, and controls the input/output unit to transmit the adjusting signal for adjusting a shutter frequency of the pair of shutter glasses according to the frequency of the ambient light indicated by the frequency signal;

wherein when the display device is in the 2D display mode and the frequency of the ambient light is higher than a threshold value, the central processing unit updates the frequency of the display monitor to substantially equal a first frequency, when the display device is in the 2D display mode and the frequency of the ambient light is lower than the threshold value, the central processing unit updates the frequency of the display monitor to substantially equal a second frequency, when the display device is in the 3D display mode and the frequency of the ambient light is higher than the threshold value, the central processing unit updates the frequency of the display monitor to substantially equal twice the first frequency, and adjusts the shutter frequency of the pair of shutter glasses to substantially equal twice the first frequency, and when the display device is in the 3D display mode and the frequency of the ambient light is lower than the threshold value, the central processing unit updates the frequency of the display monitor to substantially equal twice the second frequency, and adjusts the shutter frequency of the pair of shutter glasses to substantially equal twice the second frequency.

4. The display system of claim 3, further comprising:

a wireless transmitter, wherein the central processing unit controls the wireless transmitter via the input/output unit to transmit the adjusting signal to the pair of shutter glasses for adjusting the shutter frequency of the pair of shutter glasses.

5. The display system of claim 3, further comprising:

a storage device, for storing a digital content, wherein the central processing unit transmits the digital content to the display card, when the display device is in the 2D display mode, the display card generates the 2D display signal according to the digital content, and when the display device is in the 3D display mode, the display card generates the 3D display signal according to the digital content.

6. The display system of claim 3, wherein the first frequency is 60 Hz and the second frequency is 50 Hz.

* * * * *